United States Patent
Johnson, Jr.

(12)

(10) Patent No.: US 9,166,445 B2
(45) Date of Patent: Oct. 20, 2015

(54) AC POWER SUPPLY APPARATUS AND METHODS PROVIDING VARIABLE VOLTAGE WAVEFORMS FOR LOAD TRANSIENT CONDITIONS

(75) Inventor: Robert William Johnson, Jr., Raleigh, NC (US)

(73) Assignee: Eaton Corporation, Cleveland, OH (US)

( * ) Notice: Subject to any disclaimer, the term of this patent is extended or adjusted under 35 U.S.C. 154(b) by 953 days.

(21) Appl. No.: 13/247,608

(22) Filed: Sep. 28, 2011

(65) Prior Publication Data

US 2013/0076142 A1 Mar. 28, 2013

(51) Int. Cl.
*H02J 9/00* (2006.01)
*H02J 9/06* (2006.01)

(52) U.S. Cl.
CPC .............. *H02J 9/062* (2013.01); *Y10T 307/615* (2015.04); *Y10T 307/625* (2015.04)

(58) Field of Classification Search
None
See application file for complete search history.

(56) References Cited

U.S. PATENT DOCUMENTS

| 3,750,004 | A | 7/1973 | Walker |
| 2007/0241616 | A1 | 10/2007 | Lai et al. |
| 2008/0185914 | A1 | 8/2008 | Randall |
| 2012/0248875 | A1* | 10/2012 | Fang ................................ 307/66 |

OTHER PUBLICATIONS

International Search Report and Written Opinion Corresponding to International Application No. PCT/US2012/057457; Date of Mailing: May 13, 2013; 11 Pages.

* cited by examiner

*Primary Examiner* — Jared Fureman
*Assistant Examiner* — Aqeel Bukhari
(74) *Attorney, Agent, or Firm* — Myers Bigel Sibley & Sajovec, P.A.

(57) ABSTRACT

Some embodiments of the inventive subject matter provide methods of operating an uninterruptible power supply (UPS) configured to provide power to a load from first and second power sources, e.g., from a utility source and a battery or other backup source. The methods include operating the UPS to momentarily provide an altered voltage waveform in coordination with a transition of the load between first and second power sources. For example, the altered voltage waveform may provide a momentarily increased voltage rate of change to compensate for a transient current demand presented by the load.

20 Claims, 4 Drawing Sheets

AC POWER SUPPLY APPARATUS AND METHODS PROVIDING VARIABLE VOLTAGE WAVEFORMS FOR LOAD TRANSIENT CONDITIONS

BACKGROUND

The inventive subject matter relates to power supply apparatus and methods and, more particularly, to AC power supply apparatus and methods.

UPS systems are commonly used in installations such as data centers, medical centers and industrial facilities. UPS systems may be used in such installations to provide backup power to maintain operation in event of failure of the primary utility supply. UPS systems commonly use an inverter that generates an AC output from a DC power source, such as a battery. In an "off-line" or "standby" UPS, for example, a load may be switched from an AC utility source to an inverter powered by a battery when the utility source fails. This may result in a momentary outage to the load.

A load served by such UPS may have characteristics that place relatively large initial current demands on the UPS when transferring between normal and backup modes in responsive to an outage. For example, computers and similar electronic equipment may include power supplies with power factor correction (PFC) circuitry. When using an off-line UPS to serve such a load, a loss in a utility source may cause an outage on the order of 4-5 milliseconds before the inverter is activated to provide power to the load from a battery. When the inverter of the UPS activated to serve the load, PFC circuitry in the load's power supply may momentarily significantly increase current demand in relation to the device's normal steady-state demand as storage capacitors in the PFC circuitry are recharged. This high current demand may last one or more cycles of the AC voltage.

In a three-phase off-line UPS, this current demand may cause one or more of the phases to exhibit a diminished voltage for an extended period due current limiting by the inverter, which may cause under-voltage related disruptions and/or malfunctions. Conventional approaches for dealing with such issues include derating the UPS so that that lead under these types of transient conditions does not exceed the peak current capability of the UPS.

SUMMARY

Some embodiments of the inventive subject matter provide methods of operating an uninterruptible power supply (UPS) configured to provide power to a load from first and second power sources, e.g., from a utility source and a battery or other backup source. The methods include operating the UPS to momentarily provide an altered voltage waveform (i.e., a voltage waveform that is altered with respect to a nominal waveform produced by the UPS under steady-state conditions) in coordination with a transition of the load between first and second power sources. The altered voltage waveform may provide, for example, a momentarily increased voltage rate of change to compensate for a transient initial current demand presented by the load during recovery from an outage.

In some embodiments, operating the UPS to momentarily provide an altered voltage waveform in coordination with a transition of the load between first and second power sources includes altering a voltage control of an inverter of the UPS to provide the altered voltage waveform. Altering a control of an inverter of the UPS to provide the altered voltage waveform may include changing a scaling of a voltage reference signal.

In some embodiments, altering a voltage control of an inverter of the UPS to provide the altered voltage waveform may result in an AC output voltage having a clipped sinusoidal waveform. The clipped sinusoidal waveform may be clipped at a voltage of a DC bus of the UPS, or at a voltage of a lesser magnitude. In some embodiments, altering a voltage control of an inverter of the UPS to provide the altered voltage waveform may result in the AC output voltage having a non-sinusoidal waveform. The altered voltage waveform may be sufficient to inhibit a current limit operation of an inverter of the UPS.

In further embodiments, operating the UPS to momentarily provide an altered voltage waveform in coordination with a transition of the load between the first and second power sources may include maintaining the altered voltage waveform for at fixed time interval and/or for a time interval dependent upon a demand of the load.

In some embodiments, the UPS includes an offline UPS and operating the UPS to momentarily provide an altered voltage waveform in coordination with a transition of the load between the first and second power sources includes operating the UPS to momentarily provide an altered voltage waveform in coordination with a transition between a standby mode and a battery-powered mode of the UPS.

Further embodiments of the inventive subject matter provide an apparatus including an AC power supply circuit configured to provide a nominal steady-state AC output voltage waveform to a load and further configured to momentarily provide an increased voltage rate of change in comparison to the nominal steady-state AC output voltage waveform in responding to an outage at the load. The AC power supply circuit may be configured to provide the increased voltage rate of change in response to a transfer of the load between a utility source and an auxiliary power source. The AC power supply circuit may include an inverter and a control circuit configured to control the inverter, and the control circuit may be configured to alter a voltage control of the inverter to provide the increased voltage rate of change. For example, the control circuit may be configured to change a scaling of a voltage reference.

Further embodiments provide methods of operating an AC power supply circuit configured to be coupled to a load. Responsive to an outage at the load, the AC power supply circuit is operated to momentarily provide a first voltage waveform that compensates for a momentarily increased current demand of the load. The AC power supply circuit is then operated to provide power to the load using a second voltage waveform. The first voltage waveform may provide an increased voltage rate of change in comparison to the second voltage waveform. For example, the first voltage waveform may be a clipped sinusoidal voltage waveform and the second voltage waveform may be a sinusoidal waveform.

DETAILED DESCRIPTION OF EXEMPLARY EMBODIMENTS

Figure 1:
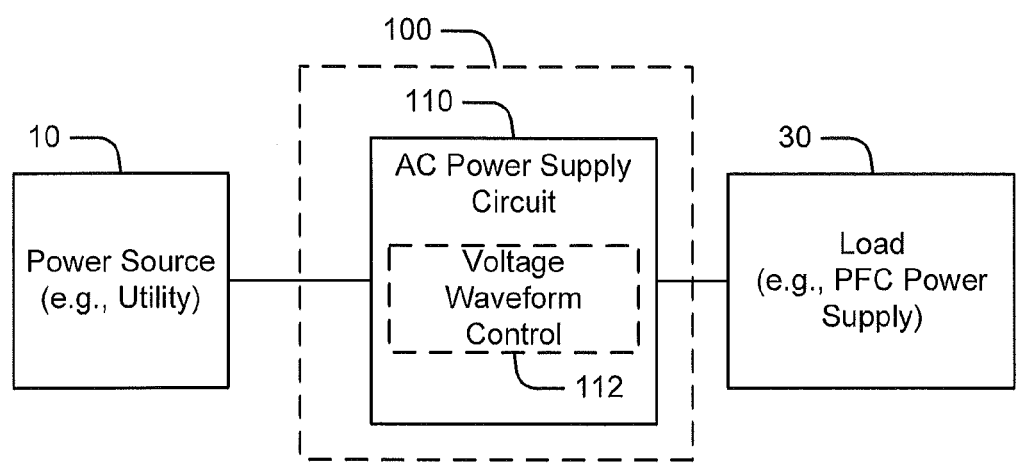
FIG. 1 is a schematic diagram illustrating an uninterruptible power supply (UPS) according to some embodiments of the inventive subject matter.

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like elements. It will be understood that when an element is referred to as being "connected" or "coupled" to another element, it can be directly connected or coupled to the other element or intervening elements may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

Exemplary embodiments are described below with reference to block diagrams and/or other illustrations of methods, apparatus (systems and/or devices) and/or computer program products. It is understood that operations illustrated in the block diagrams and/or other illustrations, and combinations of operations illustrated in the block diagrams and/or other illustrations, may be implemented by computer program instructions. These computer program instructions may be provided to a processor of a general purpose computer, special purpose computer, and/or other programmable data processing apparatus, such as an embedded control processor(s) of a UPS or other power supply device, to produce a machine, such that the instructions, which execute via the processor of the computer and/or other programmable data processing apparatus, create means (functionality) and/or structure for implementing the functions/acts specified in the block diagrams and/or other illustrations.

These computer program instructions may also be stored in a computer-readable memory that can direct a computer or other programmable data processing apparatus to function in a particular manner, such that the instructions stored in the computer-readable memory produce an article of manufacture including instructions which implement the functions/acts specified in the block diagrams and/or other illustrations.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or other illustrations.

Accordingly, exemplary embodiments may be implemented in hardware and/or in software (including firmware, resident software, micro-code, etc.). Exemplary embodiments may also take the form of a computer program product on a non-transitory computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), and a portable compact disc read-only memory (CD-ROM).

In various embodiments, functions/acts referred to in the illustrations may occur out of the order noted in the illustrations. For example, two blocks shown in succession may in fact be executed substantially concurrently or the blocks may sometimes be executed in the reverse order, depending upon the functionality/acts involved. Moreover, the functionality of a given block of the block diagrams and/or other illustrations may be separated into multiple blocks and/or the functionality of two or more blocks may be at least partially integrated.

According to some embodiments of the inventive subject matter, an output voltage waveform produced by the inverter of a UPS is momentarily altered with respect to a nominal voltage waveform produced by the UPS, in coordination with operation of an inverter of the UPS, for example, in coordination with a transfer between power sources in response to an outage. The altered waveform may increase a rate of change of the output voltage such that it compensates for a transient current behavior of the load, such as may be exhibited by a load having PFC circuitry. According to various embodiments, this may be achieved by momentarily creating a near square-wave output by, for example, increasing the magnitude of a sinusoidal voltage reference applied to the inverter's voltage control.

FIG. 1 illustrates a power supply apparatus 100 (e.g., a UPS) according to some embodiments of the inventive subject matter. The apparatus 100 includes an AC power supply circuit 110 configured to be coupled to a power source 10 and to provide AC power to a load 30, such as a device with a power factor correcting power supply. The AC power supply circuit 110 includes a voltage waveform control circuit 112 configured to momentarily alter a waveform of an AC output voltage $V_{out}$ provided to the load 30 in recovering from an outage of power delivered to the load 30. The waveform alteration may provide, for example, a momentarily increased voltage rate of change on one or more output phases of the apparatus 100.

It will be appreciated that the AC power supply circuit 110 may take any of a number of different forms. For example, in some UPS applications, the AC power supply circuit 110 may take the form of a half-bridge converter configured to generate an AC output from DC power provided by a battery or other auxiliary power source. In some embodiments, the AC power supply circuit 110 may take other forms, such as a cycloconverter or other circuit that generates an AC output. It will be appreciated that the output of the AC power supply circuit 110 may include one or more AC phases.

Figure 2:
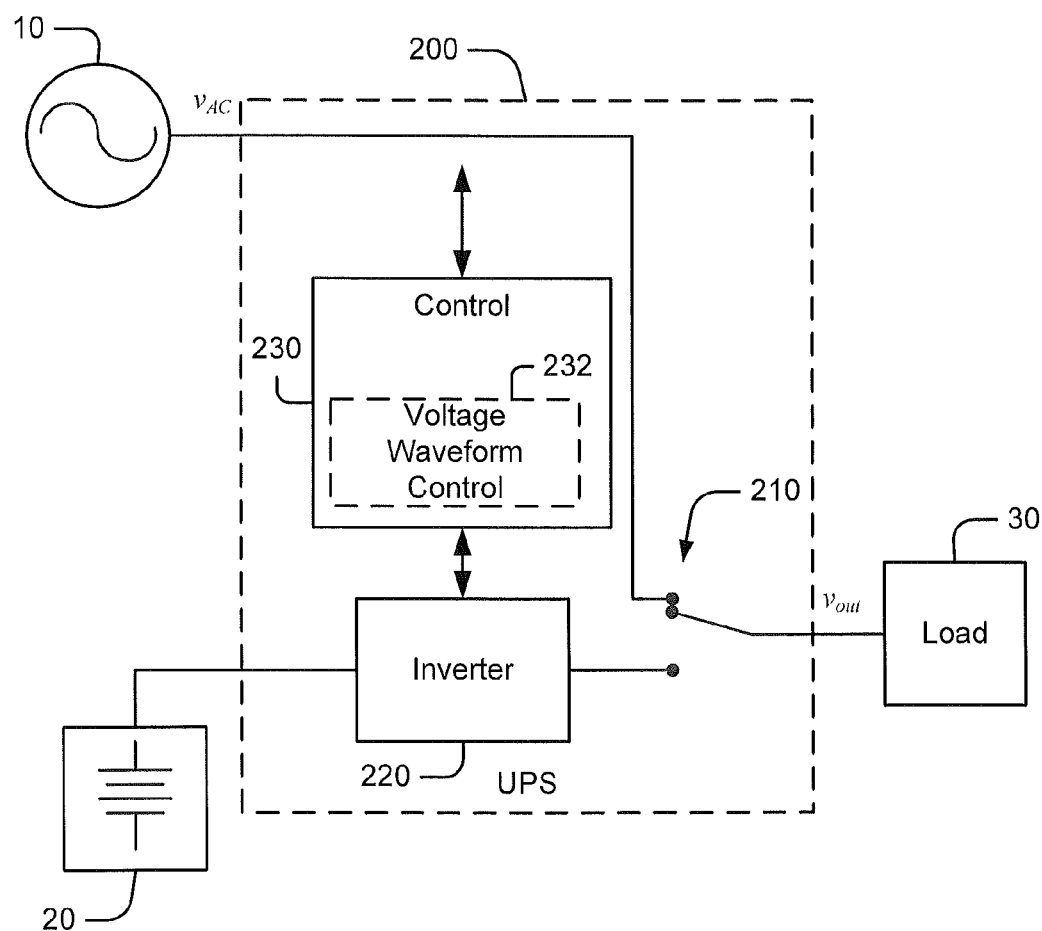
FIG. 2 is a schematic diagram illustrating a UPS with a variable inverter voltage rate of change control according to some embodiments of the inventive subject matter.

FIG. 2 illustrates an off-line UPS 200 according to some embodiments of the inventive subject matter. The UPS 200 is configured to be coupled to a utility source 10 and a battery 20. The UPS 200 includes an inverter 220, which is configured to receive power from a battery 20. The UPS 200 further includes a switch 210 configured to transfer a load 30 between the utility source 10 and the inverter 220. A control circuit 230 controls the switch 210 and the inverter 220. For example, the control circuit 230 may be configured to sense a failure of the utility source 10 and to operate the switch 210 to transfer the load to the inverter 220. As further shown, the control circuit 230 may include a voltage waveform control circuit 232 configured to cause the inverter 220 to momentarily alter a waveform of an AC output voltage $V_{out}$ produced by the inverter 220 in coordination with such a transfer, such that the voltage waveform momentarily devices from a nominal steady state condition. The waveform alteration may, for example, provide a momentarily increased voltage rate of change. This capability may be used, for example, to compensate for transient current demands of the load 30, such as might arise from operation of a PFC power supply.

It will be appreciated that the inverter 220 and control circuit 230 may take any of a number of different forms. For example, the inverter 220 may take the form of a single-phase or three-phase half-bridge circuit. The control circuit 230 may, in general, be implemented using analog and/or digital circuitry, including, for example, a microcontroller, microprocessor or equivalent thereof programmed with suitable program code to cause the UPS 200 to operate as described above.

Although the inventive subject matter may be advantageously used in off-line (standby) UPSs, such as the UPS 200 of FIG. 2, it will be appreciated that other types of UPS's may be similarly configured. For example, operations similar to those of the UPS 200 may be used in on-line (double conversion) or line-interactive UPSs that have bypass circuitry that is used to provide power to a load in an economy or high-efficiency mode, and may be used to provide an increased voltage rate of change when transferring between such a bypassed mode and an inverter-powered mode.

According to further embodiments of the inventive subject matter, transient voltage waveform control along the lines discussed above may be implemented by controlling a waveform reference used by a voltage control of an inverter. For example, a UPS 300 illustrated in FIG. 3 includes a switch 310 configured to selectively couple a load to a utility source 10 and a half-bridge inverter circuit 320, which receives power from a battery or other auxiliary source (not shown) via DC busses 330 having voltages VDC+, VDC−. The UPS 300 further includes a control circuit 340, which controls the switch 310 and the half-bridge inverter 320. More particularly, the control circuit 340 includes an inverter voltage control circuit 342, which implements a voltage control loop by comparing an output voltage $v_{out}$ produced by the half-bridge inverter 320 to a voltage reference generated by a variable voltage reference generator circuit 344. Generally, the voltage reference produced by the variable voltage reference generator circuit 344 provides information describing a desired waveform for the output voltage $v_{out}$, which the voltage control circuit 342 acts to impose on the output voltage $v_{out}$ by appropriate controlling transistors or other semiconductor switching devices in the half-bridge inverter 320. For example, under steady-state conditions, the voltage reference waveform information may correspond to a sinusoid having a particular amplitude and phase. Under certain transient conditions, however, such as when the UPS 300 is transferring the load to the inverter 320 in response to an outage of the utility source 10, the variable voltage reference generator circuit 344 may momentarily provide an altered voltage reference waveform that causes the output voltage $v_{out}$ to exhibit, for example, an increased voltage rate of change along the lines discussed above.

Figure 3:
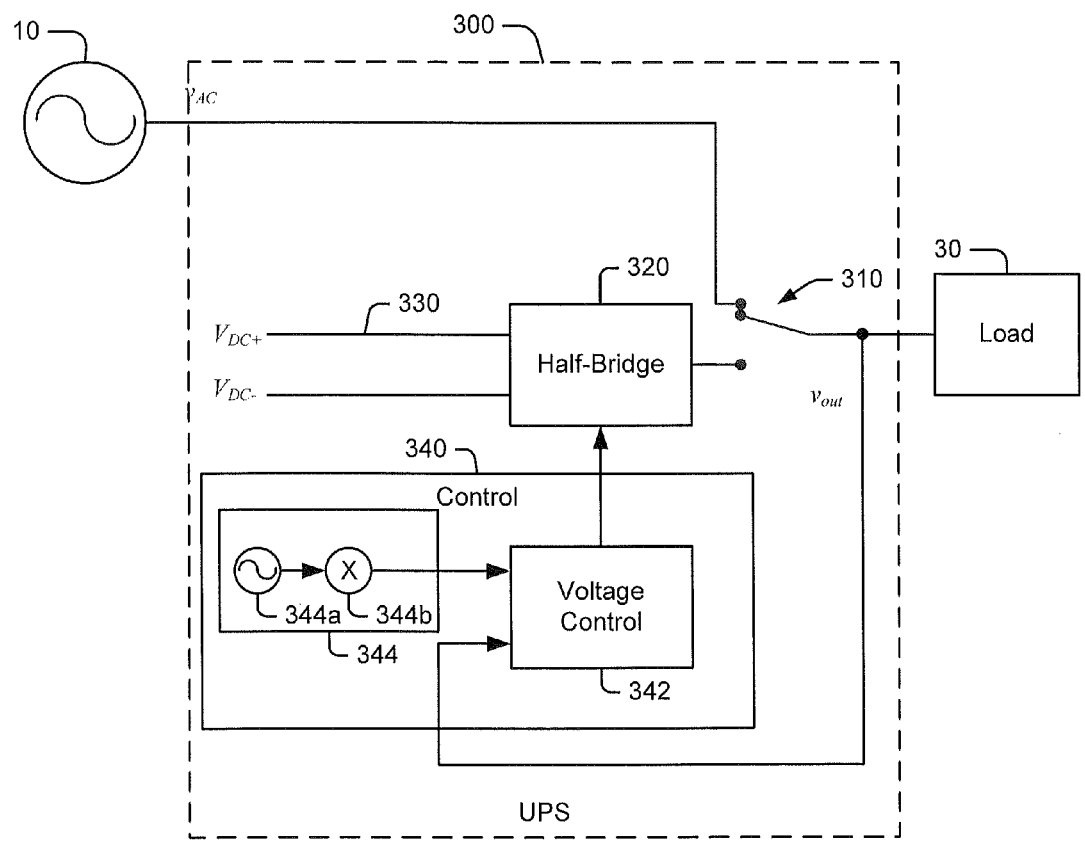
FIG. 3 is a schematic diagram illustrating a UPS with a variable voltage reference generator according to some embodiments of the inventive subject matter.

As further shown in FIG. 3, this variation in the voltage reference may be achieved by changing a scaling applied by a multiplier 344b to a sinusoidal reference signal produced by a sinusoidal reference signal generator 344a. This may result in an amplified voltage reference signal being provided to the voltage control circuit 342. In response to such a reference, the voltage control circuit 324 may cause the half-bridge inverter 320 to operate such that the output voltage $v_{out}$ has a clipped sinusoidal waveform. The clipping may arise from the limits of the DC bus voltages $V_{DC+}$, $V_{DC-}$ themselves or, in some embodiments, the voltage control circuit 342 may implement an internal limit which similarly clips the output voltage $v_{out}$ waveform at magnitudes less than that of the DC bus voltages $V_{DC+}$, $V_{DC-}$.

The period of operation with the altered voltage waveform may be controlled in a number of different ways. For example, the variable voltage reference generator circuit 344 may maintain the altered voltage waveform for a fixed interval, such as a period corresponding to 1 or 2 cycles of the desired AC voltage. In some embodiments, the variable voltage reference generator circuit 344 may monitor the output current $i_{out}$ and may revert to a normal sinusoidal waveform upon detection that the output current $i_{out}$ has fallen to a particular level.

Figure 4:
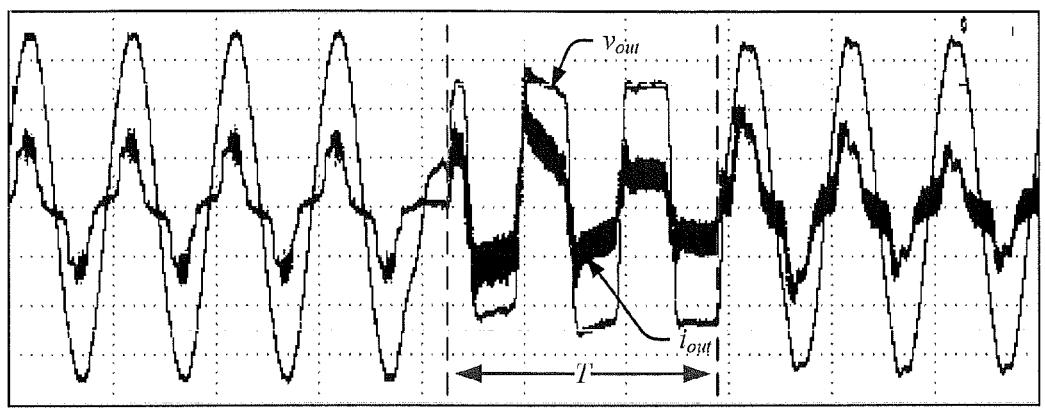
FIG. 4 is a waveform diagram illustrating voltage and current waveforms for a UPS according to further embodiments of the inventive subject matter.

An example of operation using such a technique in a standby UPS is illustrated in FIG. 4. In particular, an output voltage $v_{out}$ exhibits a momentary clipped sinusoidal waveform that approaches a square wave in appearance during a time interval T, corresponding to a transient period when the UPS transfers from utility-powered mode to battery-powered mode in response to a utility outage. In the illustrated example, the UPS is driving a load with a PFC circuit and, as can be seen, the increased voltage rate of change provided by the UPS enables the UPS to compensate for the increased output current $i_{out}$ due to action of the PFC, which persists for 1-2 cycles of the voltage waveform.

It will be appreciated that other approaches may be used to achieve similar effects. For example, instead of scaling a sinusoidal reference as described above with reference to FIGS. 3 and 4, a voltage reference generator, such as the voltage reference generator 344 of FIG. 4, may generate an arbitrary voltage waveform reference that provides, for example, a desired increased voltage rate of change. For example, the voltage reference generator may momentarily generate a square wave or trapezoidal wave reference for controlling an inverter during a transient period corresponding to an outage-induced transfer, such that the output voltage generated by the inverter approximates these waveforms for the transient period.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:

1. A method of operating an uninterruptible power supply (UPS) configured to provide power to a load from first and second power sources, the method comprising:
    transitioning a voltage provided at the output of the UPS from a first voltage waveform to a second voltage waveform in coordination with a transition of the load between the first and second power sources; and then
    transitioning the voltage back to the first voltage waveform, wherein the second voltage waveform provides an increased voltage rate of change in comparison to the first voltage waveform and wherein transitioning the voltage provided at the output of the UPS from the first voltage waveform to the second voltage waveform in coordination with the transition of the load between the first and second power sources comprises changing a scaling of a voltage reference signal.

2. The method of claim 1, wherein the first power source comprises a utility source and wherein the second power source comprises a battery.

3. The method of claim 1, wherein transitioning the voltage provided at the output of the UPS from the first voltage waveform to the second voltage waveform in coordination with the transition of the load between the first and second power sources comprises operating the UPS to provide the second voltage waveform responsive to a failure of the utility source.

4. The method of claim 1, wherein the second voltage waveform is a clipped sinusoidal waveform.

5. The method of claim 4, wherein the clipped sinusoidal waveform is clipped at a voltage of a DC bus of the UPS.

6. The method of claim 4, wherein the clipped sinusoidal waveform is clipped at a voltage magnitude less than a voltage magnitude of a DC bus of the UPS.

7. The method of claim 1, wherein the second voltage waveform is a non-sinusoidal waveform.

8. The method of claim 1, wherein the second voltage waveform is sufficient to inhibit a current limit operation of an inverter of the UPS.

9. The method of claim 1, wherein transitioning the voltage provided at the output of the UPS from the first voltage waveform to the second voltage waveform in coordination with the transition of the load between the first and second power sources comprises maintaining the second voltage waveform for a fixed time interval and/or for a time interval dependent upon a demand of the load.

10. The method of claim 1, wherein the UPS comprises an offline UPS and wherein transitioning the voltage provided at the output of the UPS from the first voltage waveform to the second voltage waveform in coordination with the transition of the load between the first and second power sources comprises operating the UPS to provide the second voltage waveform in coordination with a transition between a standby mode and a battery-powered mode of the UPS.

11. A non-transitory computer-readable medium comprising computer-readable code that, when executed in a control processor of the UPS, causes the UPS to perform the operations of claim 1.

12. A UPS configured to perform the method of claim 1.

13. An apparatus comprising:
    an inverter; and a control circuit configured to cause the inverter to provide a first AC output voltage waveform to a load and to transition to providing a second AC output voltage waveform to the load having an increased voltage rate of change in comparison to the first AC output voltage waveform for an interval in response to an outage at the load, wherein an AC power supply circuit is configured to provide the increased voltage rate of change in response to a transfer of the load between a utility source and an auxiliary power source; wherein the control circuit is configured to change a scaling of a voltage reference.

14. A UPS comprising the apparatus of claim 13, wherein the AC power supply circuit is configured to provide the increased voltage rate of change in response to a transfer of the load between a utility source and an auxiliary power source.

15. The apparatus of claim 13, wherein the first AC output voltage waveform is an unclipped sinusoidal waveform and wherein the second AC output voltage waveform is a clipped sinusoidal waveform.

16. The apparatus of claim 13, wherein the AC power supply circuit is configured to maintain the second AC output voltage waveform for a fixed time interval and/or for a time interval dependent upon a demand of the load.

17. A method of operating an AC power supply circuit configured to be coupled to a load, the method comprising:
    responsive to an outage at the load, operating the AC power supply circuit to provide a first voltage waveform that compensates for an initial current demand of the load; and then
    operating the AC power supply circuit to provide power to the load using a second voltage waveform, wherein the first voltage waveform provides an increased voltage rate of change in comparison to the second voltage waveform and wherein operating the AC power supply circuit to provide power to the load using a second voltage waveform comprises changing a scaling of a voltage reference signal.

18. The method of claim 17, wherein the first voltage waveform comprises a clipped sinusoidal voltage waveform and wherein the second voltage waveform comprises a sinusoidal waveform.

19. A UPS configured to perform the method of claim 17.

20. A non-transitory computer-readable medium comprising computer-readable code that, when executed in a control processor of a UPS, causes the UPS to perform the operations of claim 17.

* * * * *